United States Patent
Dighde et al.

(10) Patent No.: US 9,195,083 B2
(45) Date of Patent: Nov. 24, 2015

(54) IMPACT RESISTANT CONSTRUCTION OF AN INTERACTIVE DEVICE

(75) Inventors: Rajesh Dighde, Redmond, WA (US); Andrew Hill, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/284,989

(22) Filed: Oct. 31, 2011

(65) Prior Publication Data
US 2013/0107143 A1 May 2, 2013

(51) Int. Cl.
*G02F 1/1333* (2006.01)

(52) U.S. Cl.
CPC ...... *G02F 1/133308* (2013.01); *G02F 1/13338* (2013.01); *G02F 2001/133325* (2013.01); *G02F 2001/133331* (2013.01); *G02F 2201/503* (2013.01); *Y10T 29/49826* (2015.01)

(58) Field of Classification Search
CPC ............. G02F 2201/503; G02F 1/133308; G02F 2001/133325
USPC .............................. 349/56, 58, 60
See application file for complete search history.

(56) References Cited

U.S. PATENT DOCUMENTS

| | | | |
|---|---|---|---|
| 5,150,231 A | | 9/1992 | Iwamoto et al. |
| 5,568,357 A | * | 10/1996 | Kochis et al. ................... 349/58 |
| 5,606,438 A | * | 2/1997 | Margalit et al. ................. 349/60 |
| 5,846,942 A | | 12/1998 | Horwell et al. |
| 6,175,396 B1 | | 1/2001 | Kim et al. |
| 6,608,664 B1 | | 8/2003 | Hasegawa |
| 7,130,185 B2 | | 10/2006 | Chen et al. |
| 7,701,699 B2 | * | 4/2010 | Ma ................................... 349/58 |
| 7,944,520 B2 | | 5/2011 | Ichioka et al. |
| 2003/0128307 A1 | * | 7/2003 | Ito et al. ........................... 349/58 |
| 2003/0202146 A1 | * | 10/2003 | Takeda et al. ................. 349/129 |
| 2003/0223024 A1 | | 12/2003 | Ogawa |
| 2005/0094039 A1 | * | 5/2005 | Kim et al. ........................ 349/12 |
| 2007/0263347 A1 | * | 11/2007 | Hong et al. ...................... 349/58 |
| 2008/0043171 A1 | | 2/2008 | Takahashi et al. |
| 2008/0074577 A1 | | 3/2008 | Sato |
| 2008/0297679 A1 | | 12/2008 | Jung et al. |

(Continued)

FOREIGN PATENT DOCUMENTS

EP 2282255 A1 2/2011

OTHER PUBLICATIONS

Cheng, et al., "Design and Analysis of Shock-Absorbing Structure for Flat Panel Display", Retrieved at <<http://ieeexplore.ieee.org/stamp/stamp.jsp?tp=&arnumber=4383010>>, IEEE Transactions on Advanced Packaging, vol. 31, No. 1, Feb. 2008, pp. 135-142.

(Continued)

*Primary Examiner* — Richard Kim
*Assistant Examiner* — Ryan Crockett
(74) *Attorney, Agent, or Firm* — Jeremy Snodgrass; Judy Yee; Micky Minhas

(57) ABSTRACT

In one embodiment, a high impact resistance display module 300 may avoid damage better than a standard display module 200. An interactive touch screen may create a mounting surface on a display chassis 312 that is level with a liquid crystal display panel 302 using an adjustable adapter plate 330. An interactive touch screen may attach an optically clear protective plate 334 to the liquid crystal display panel 302. An interactive touch screen may attach an optically clear protective plate 334 to the mounting surface.

20 Claims, 5 Drawing Sheets

(56) References Cited

U.S. PATENT DOCUMENTS

| | | | |
|---|---|---|---|
| 2010/0045889 A1* | 2/2010 | Yuan et al. | 349/58 |
| 2010/0066936 A1* | 3/2010 | Garrett et al. | 349/58 |
| 2010/0103640 A1 | 4/2010 | Brown et al. | |
| 2010/0188623 A1* | 7/2010 | Nakagawa | 349/96 |
| 2010/0247940 A1 | 9/2010 | Takahashi et al. | |
| 2010/0296027 A1 | 11/2010 | Matsuhira et al. | |
| 2010/0321606 A1* | 12/2010 | Liou et al. | 349/60 |

OTHER PUBLICATIONS

Dighde, et al., "Ruggedized Display Device", 12889212, Filed Date: Sep. 23, 2010, pp. 24.

"International Search Report", Mail Date: Mar. 25, 2013, Application No. PCT/US2012/062501, Filed date: Oct. 30, 2012, pp. 10.

"Extended European Search Report", Mail Date: Aug. 27, 2015, Application No. PCT/US2012/062501, pp. 9.

* cited by examiner

IMPACT RESISTANT CONSTRUCTION OF AN INTERACTIVE DEVICE

BACKGROUND

A large interactive multi-touch display may allow multiple users to interact with a device. To allow for greater interaction, the multi-touch display may have a seamless interactive area with the interactive cover glass extended to the edge. The interactive cover glass may be flush with a protective bezel surrounding the display. The seams between the interactive cover glass may be as small as possible to reduce the amount of contamination that may enter the seam.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to avoiding damage to an interactive touch screen. An interactive touch screen may create a mounting surface on a display chassis that is level with a liquid crystal display panel using an adjustable adapter plate. An interactive touch screen may attach an optically clear protective plate to the liquid crystal display panel. An interactive touch screen may attach an optically clear protective plate to the mounting surface.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 4:
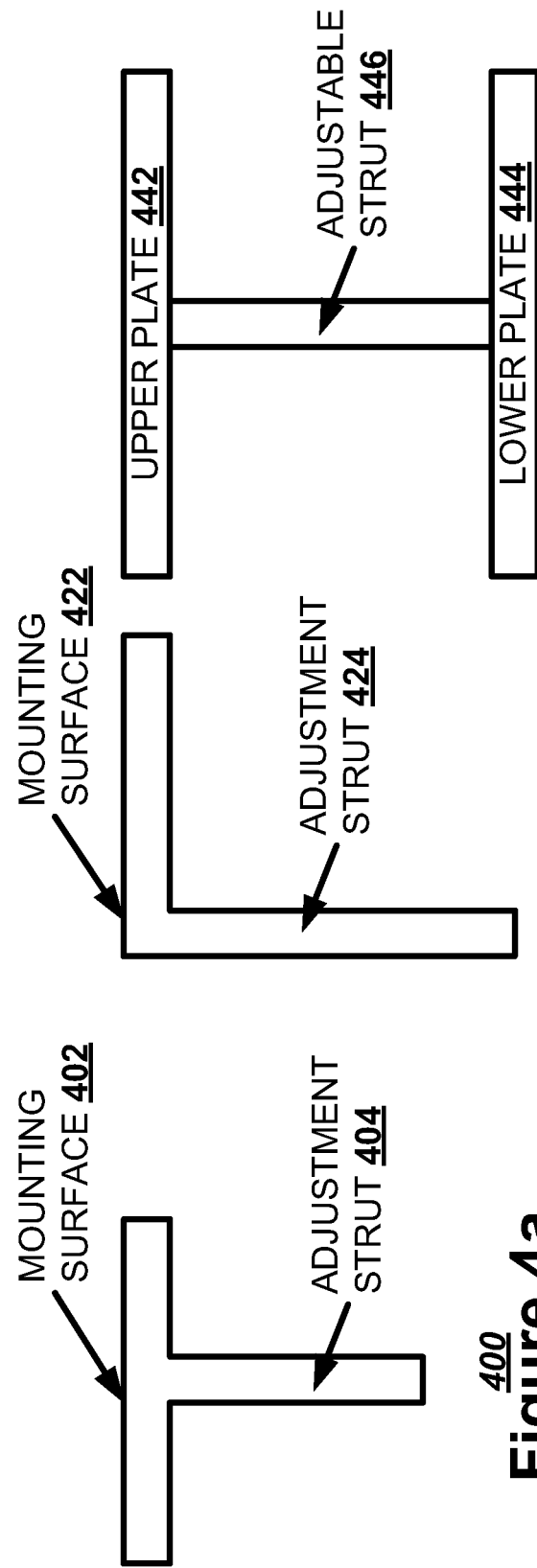

FIGS. 4a-c illustrate, in block diagrams, different embodiments of adjustable adapter plates.

Figure 5:
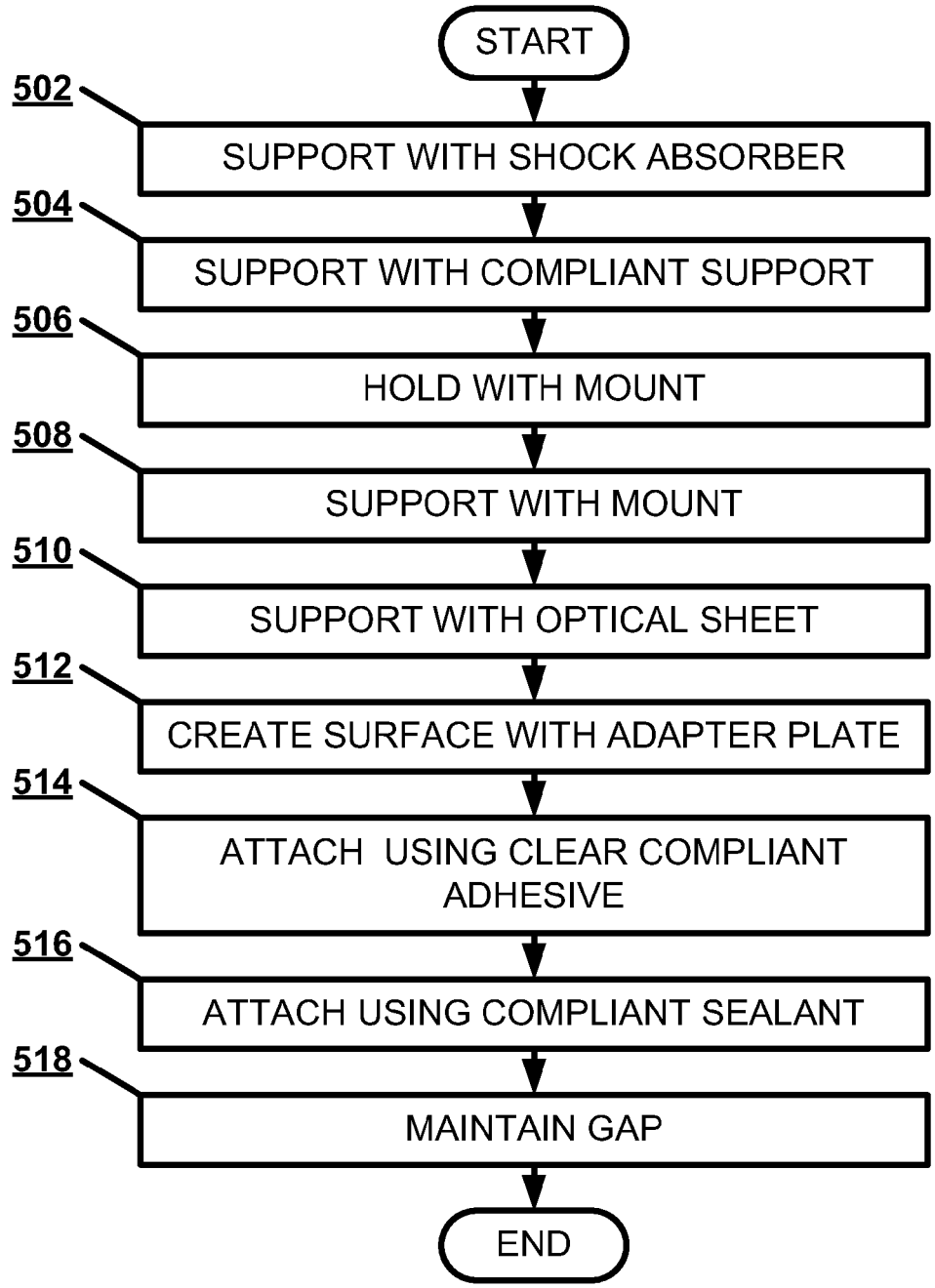

FIG. 5 illustrates, in a flowchart, one embodiment of a method for protecting a display system.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, an electronic device, or an interactive touch screen for a computing device.

Improvements to an interactive touch screen may improve response to an object drop related break or a side impact related break of a display or the cover glass. A newer liquid crystal display, such as an organic light emitting diode (OLED), may be sensitive to applied or residual stress as the stress changes the polarization mode of the embedded liquid crystals and cause display defects, such as light leakage or different color bands. These defects may have a significant impact on the user experience. Changes may be made to the interactive touch screen structure to isolate the liquid crystal display panel from outside stresses. The interactive touch screen may have strategically placed compliant adhesives and structures to protect critical aspects of the interactive touch screen. A compliant adhesive or structure is any adhesive or structure that has a degree of give or flexibility that protects the adhesive or structures from impacts and other stresses.

Thus, in one embodiment, a high impact resistance display module may avoid damage better than a standard display module. An interactive touch screen may create a mounting surface on a display chassis that is level with a liquid crystal display panel using an adjustable adapter plate. An interactive touch screen may attach an optically clear protective plate to the liquid crystal display panel. An interactive touch screen may attach an optically clear protective plate to the mounting surface.

Figure 1:
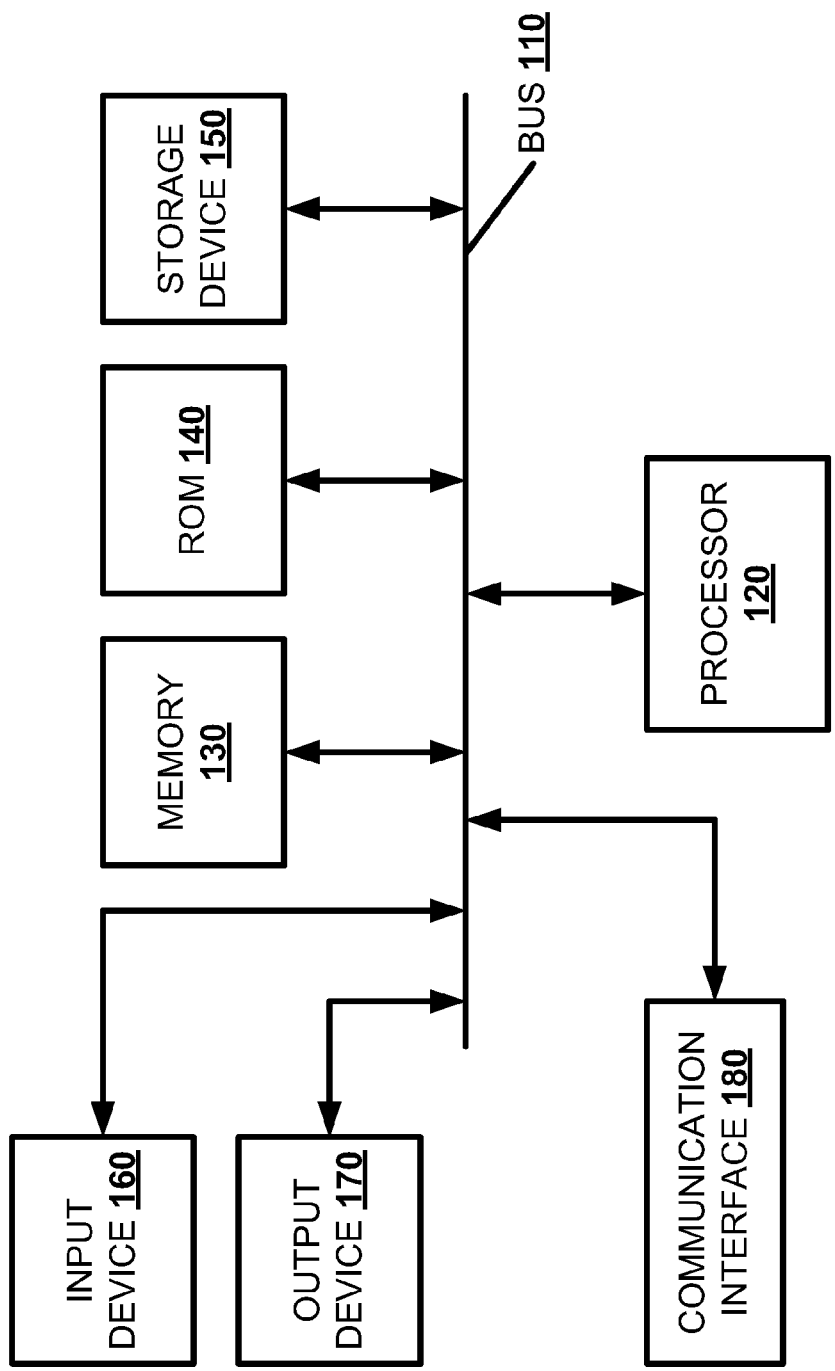
FIG. 1 illustrates, in a block diagram, one embodiment of a computing device having an interactive touch screen.

FIG. 1 illustrates a block diagram of an exemplary computing device 100 which may have an interactive touch screen. The computing device 100 may combine one or more of hardware, software, firmware, and system-on-a-chip technology to implement the electronic features of the impact resistant interactive touch screen. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive.

The input device 160 may include one or more conventional mechanisms that permit a user to input information to the computing device 100, such as an interactive touch screen, a keyboard, a mouse, a voice recognition device, a microphone, a headset, etc. The output device 170 may include one or more conventional mechanisms that output information to the user, including an interactive touch screen, a display, a printer, one or more speakers, a headset, or a medium, such as a memory, or a magnetic or optical disk and a corresponding disk drive. The communication interface 180 may include any transceiver-like mechanism that enables processing device 100 to communicate with other devices or networks.

Figure 2:
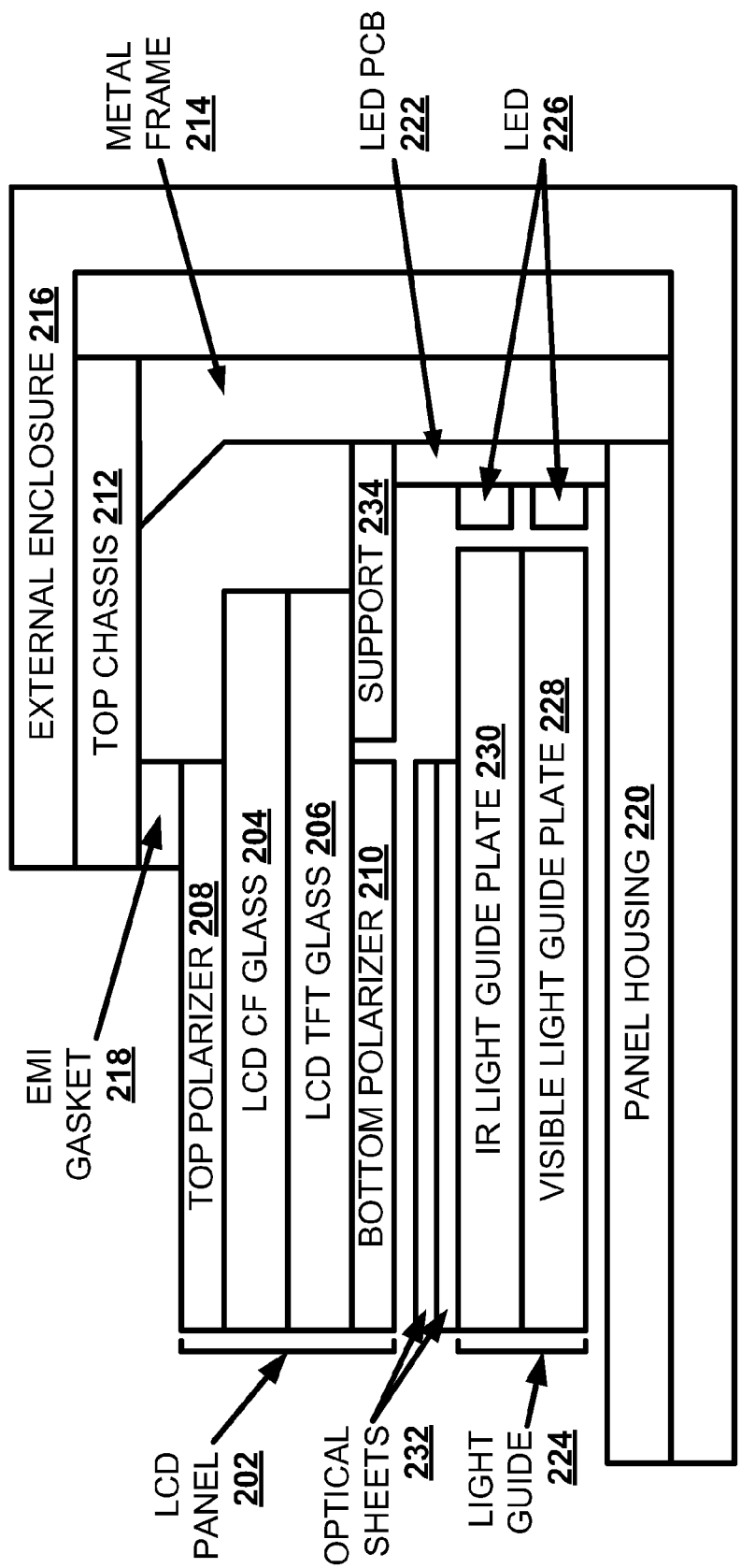
FIG. 2 illustrates, in a block diagram, one embodiment of a standard interactive display module.

The computing device 100 may have a standard display panel structure. FIG. 2 illustrates, in a block diagram, one embodiment of a standard interactive display module 200. The standard interactive display module 200 may have a liquid crystal display (LCD) panel 202 for presenting the data to be projected through the screen. The liquid crystal display panel 202 may have a color filter (CF) glass 204 to determine color and a thin filter transistor (TFT) glass 206 to improve contrast. The color filter glass 204 may have a width between 0.3 mm and 0.7 mm. The thin filter transistor glass 206 may have a width between 0.3 mm and 0.7 mm. The liquid crystal display panel 202 may have a top polarizer 208 and a bottom polarizer 210 to define the polarization of light entering and exiting the liquid crystal display panel 202.

A top chassis 212 supported by a metal frame 214 may rest atop the outer edge of the liquid crystal display panel 202. The top chassis may have a width of 0.6 mm. An external enclosure 216 may cover the top chassis 212 and metal frame 214. An electromagnetic interference (EMI) gasket 218 may connect the top chassis 212 and the liquid crystal display panel 202 and prevent any outside contaminants from getting into the standard interactive display module 200.

A panel housing 220 may support a light emitting diode (LED) printed circuit board (PCB) 222 and a light guide 224. The light emitting diode printed circuit board 222 may have one or more light emitting diodes 226 directed into the light guide 224. The light guide 224 may have a visible light guide plate 228 and an infrared (IR) light guide plate 230. The light guide 224 may direct light from the light emitting diode 226 up through one or more optical sheets 232 to the liquid crystal display panel 202.

A support 234 may project out from the metal frame 214 to support the liquid crystal display panel 202 above the light guide 224. The support 234 may maintain a 2 mm air gap between the optical sheets 232 and the liquid crystal display panel 202.

Figure 3:
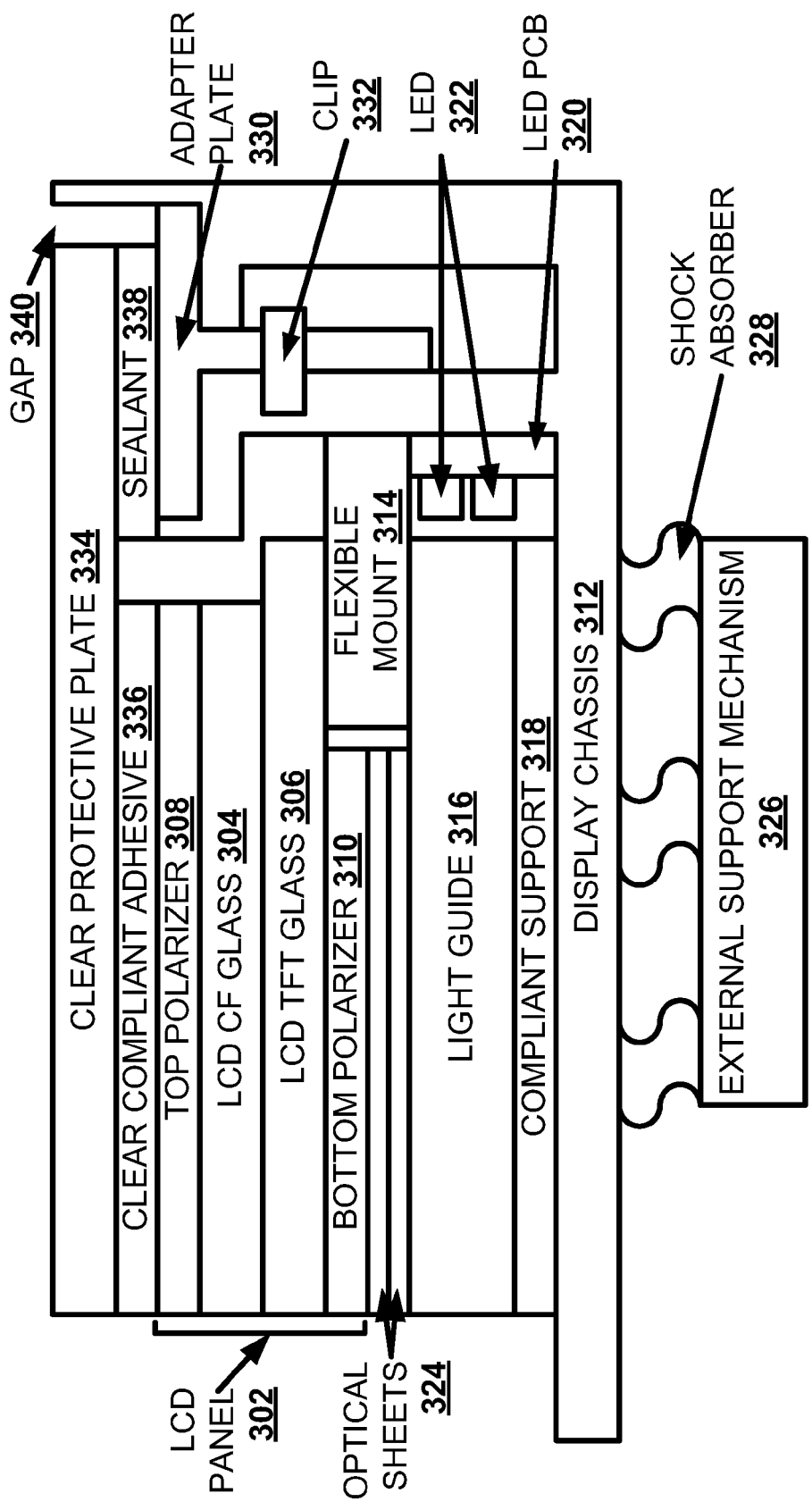
FIG. 3 illustrates, in a block diagram, one embodiment of a high impact resistance display system.

This standard interactive display module 200 may be modified to improve resistance to impact and side shocks. FIG. 3 illustrates, in a block diagram, one embodiment of a high impact resistance display module 300. The high impact resistance display module 300 may have a liquid crystal display panel 302 for presenting the data to be projected through the screen. The liquid crystal display panel 302 may have a color filter glass 304 to determine color and a thin filter transistor glass 306 to improve contrast. The color filter glass 304 may have a width between 0.3 mm and 0.7 mm. The thin filter transistor glass 306 may have a width between 0.3 mm and 0.7 mm. The liquid crystal display panel 302 may have a top polarizer 308 and a bottom polarizer 310 to define the polarization of light entering and exiting the liquid crystal display panel 302.

A display chassis 312 may contain the liquid crystal display panel 302. A flexible mount 314 may project out from the display chassis 312 to support the liquid crystal display panel 302. The display chassis 312 may support a light guide 316 with an optically clear compliant support 318. The optically clear compliant support 318 may dissipate impact energy. The optically clear compliant support 318 may be placed in any place in the stack.

The display chassis 312 may support a light emitting diode printed circuit board 320. The light emitting diode printed circuit board 320 may have one or more light emitting diodes 322 directed into the light guide 316. The light guide 316 may direct light from the light emitting diode 322 up through one or more compliant optical sheets 324 to the liquid crystal display panel 302. The compliant optical sheets 324 may dissipate impact energy and reduce stress on liquid crystals. The liquid crystal display panel 302 may be placed so that no gap exists between the liquid crystal display 302 and the compliant optical sheets 324. The display chassis 312 may be placed on an external support mechanism 326 with one or more shock absorbers 328 connecting the display chassis 312 to the external support mechanism 326. The shock absorbers 328 may dissipate vertical and side impacts.

An adjustable adapter plate 330 may be attached to the display chassis 312 with a clip 332 or other fastening mechanism. The adjustable adapter plate 330 may create a mounting surface that is level with the liquid crystal display panel 302. An optically clear protective plate 334 may be placed atop the liquid crystal display panel 302. The optically clear protective plate 334 may be a chemically strengthened protective glass or plastic. The optically clear protective plate 334 may have a thickness of anywhere from 0.1 mm to 2 mm or more. An optically clear compliant adhesive 336 may attach the optically clear protective plate 334 to the liquid crystal display panel 302. A compliant adhesive sealant 338 may attach the optically clear protective plate 334 to the adjustable adapter plate 330. The compliant adhesive sealant 338 may be optically clear, translucent, or even opaque. The same optically clear compliant adhesive 336 may be used to cover the liquid crystal display panel 302 and the adjustable adapter plate 330 depending on the assembly sequence of the device. The adjustable adapter plate 330 may protect the edge of the optically clear protective plate 334 from side impact. The optically clear protective plate 334 may be placed to maintain a gasket or an air gap 340 to allow for a coefficient of thermal expansion mismatch between the display chassis 312 and the optically clear protective plate 334. Thus, the optically clear protective plate 334 may expand at a different rate due to heat changes than the display chassis 312 without damaging either component.

A variety of adjustable adapter plates 330 may create the mounting surface on the display chassis 312. As shown in FIG. 4a, the adjustable adapter plate 330 may be a T-bracket 400. The level of the mounting surface 402 of the T-bracket 400 may be moved to be level with the liquid crystal display panel by positioning an adjustment strut 404 in a gap in the display chassis 312.

As shown in FIG. 4b, the adjustable adapter plate 330 may be an L-bracket 420. The level of the mounting surface 422 of the L-bracket 420 may be moved to be level with the liquid crystal display panel by positioning an adjustment strut 424 in a gap in the display chassis 312. The L-bracket 420 may form a rectangular liquid crystal display chassis to house electronics, light emitting diodes, optical sheets, and a light guide plate. This assembly scheme may be used to provide a face down assembly of the interactive device by using the liquid crystal display on a flat surface. This arrangement may enable an interactive device with a flat top surface with the optical sheets and the light guide plate providing support from beneath.

As shown in FIG. 4c, the adjustable adapter plate 330 may be an H-bracket 440. The H-bracket 440 may have an upper plate 442 and a lower plate 444. An adjustable strut 446 may vary the distance between the upper plate 442 and the lower plate 444. The lower plate 444 may be placed on the display chassis 312 while the upper plate 442 acts as a mounting surface for the optically clear protective plate 334.

FIG. 5 illustrates, in a flowchart, one embodiment of a method 500 for protecting a display system. One or more shock absorbers 328 may support a display chassis 312 above the external support mechanism 326 (Block 502). An optically clear compliant support 318 may support a light guide 316 on the display chassis 312 (Block 504). A flexible mount 314 may hold the light guide 316 to the display chassis 312 (Block 506). The flexible mount 314 may support a liquid crystal display panel 302 (Block 508). A compliant optical sheet 324 may support the liquid crystal display panel 302 while dissipating impact energy (Block 510). An adjustable adapter plate 330 may create a mounting surface on the display chassis 312 that is level with the liquid crystal display panel 302 (Block 512). The adjustable adapter plate 330 may be a T-bracket 400, an L-bracket 420, or an H-bracket 440. An optically clear compliant adhesive 336 may attach the optically clear protective plate 334 to the liquid crystal display panel 302 (Block 514). A compliant adhesive sealant 338 may attach the optically clear protective plate 334 to the mounting surface of the adjustable adapter plate 330 (Block 516). The optically clear protective plate 334 may maintain an expansion gap 340 with a display chassis 312 rim to allow for thermal expansion (Block 518).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A method, comprising:
    creating a mounting surface on a display chassis that is level with a polarizer of a display panel using an adjustable adapter plate movable relative to a level of the display panel by positioning an adjustment strut of the adjustable adapter plate relative to the display chassis;
    attaching an optically clear protective plate to the display panel; and
    attaching the optically clear protective plate to the mounting surface.

2. The method of claim 1, further comprising:
    supporting the display panel with a compliant optical sheet that dissipates impact energy.

3. The method of claim 1, further comprising:
    supporting the display panel with a flexible mount.

4. The method of claim 1, further comprising:
    holding a light guide with a flexible mount.

5. The method of claim 1, further comprising:
    supporting a light guide with an optically clear compliant support.

6. The method of claim 1, further comprising:
    attaching the optically clear protective plate to the display panel with an optically clear compliant adhesive.

7. The method of claim 1, further comprising:
    attaching the optically clear protective plate to the adjustable adapter plate with a compliant adhesive sealant.

8. The method of claim 1, further comprising:
    supporting the display chassis with a shock absorber.

9. The method of claim 1, further comprising:
    maintaining an expansion gap between the optically clear protective plate and a display chassis rim to allow for thermal expansion.

10. The method of claim 1, further comprising:
    using at least one of a T-bracket, an L-bracket, and an H-bracket as the adjustable adapter plate.

11. An electronic device comprising:
    a display panel;
    a display chassis that contains the display panel;
    an optically clear protective plate disposed over the display panel;
    an adjustable adapter plate movable relative to a level of the display panel to create a mounting surface level with a polarizer of the display panel for attaching the optically clear protective plate by positioning an adjustment strut of the adjustable adapter plate relative to the display chassis; and
    a compliant optical sheet that supports the display panel and dissipates impact energy.

12. The electronic device of claim 11, further comprising:
    a light guide beneath the compliant optical sheet.

13. The electronic device of claim 12, further comprising:
    an optically clear compliant support that supports the light guide.

14. The electronic device of claim 12, further comprising:
    a flexible mount to hold the light guide and support the display panel.

15. The electronic device of claim 11, wherein the optically clear protective plate maintains an expansion gap with a display chassis rim to allow for thermal expansion.

16. The electronic device of claim 11, further comprising:
    an optically clear compliant adhesive attaching the optically clear protective plate to the display panel.

17. The electronic device of claim 11, wherein the adjustable adapter plate is at least one of a T-bracket, an L-bracket, and an H-bracket.

18. The electronic device of claim 11, further comprising:
    a compliant adhesive sealant attaching the adjustable adapter plate to the optically clear protective plate.

19. An interactive touch screen, comprising:
    a display panel;
    a display chassis that contains the display panel;
    an optically clear protective plate disposed over the display panel;
    an adjustable adapter plate movable relative to a level of the display panel to create a mounting surface level with a polarizer of the display panel for attaching the optically clear protective plate by positioning an adjustment strut of the adjustable adapter plate relative to the display chassis;
    a compliant optical sheet that supports the display panel and dissipates impact energy; and
    a shock absorber attached to an external support mechanism to support the display chassis.

20. The interactive touch screen of claim 19, further comprising:
    a light guide beneath the compliant optical sheet; and
    an optically clear compliant support that supports the light guide.

* * * * *